No. 801,021. PATENTED OCT. 3, 1905.
H. E. KUHNER.
MECHANICAL MOVEMENT.
APPLICATION FILED APR. 1, 1905.
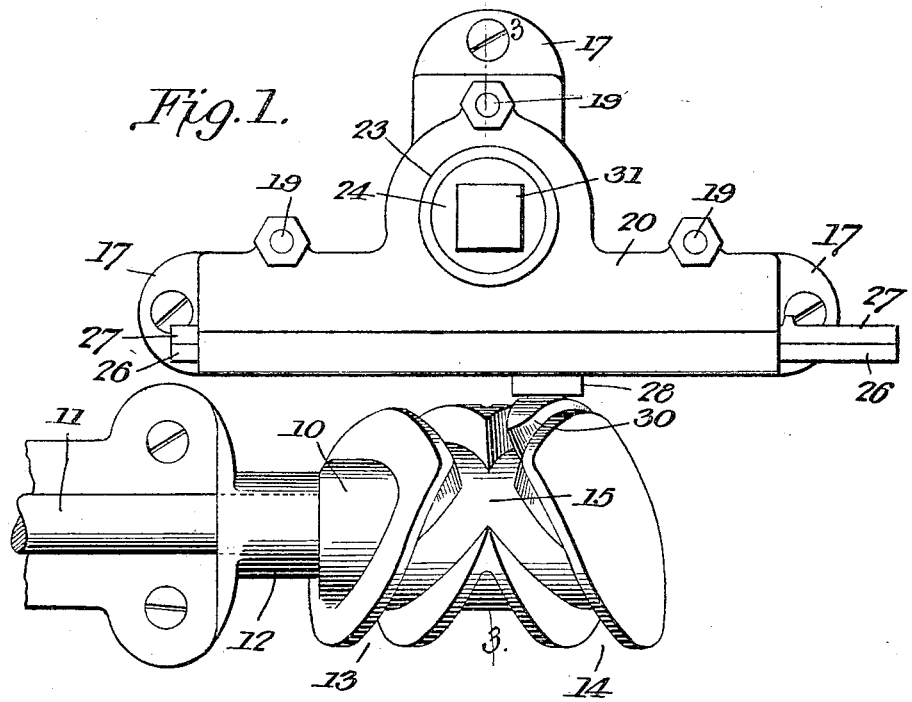
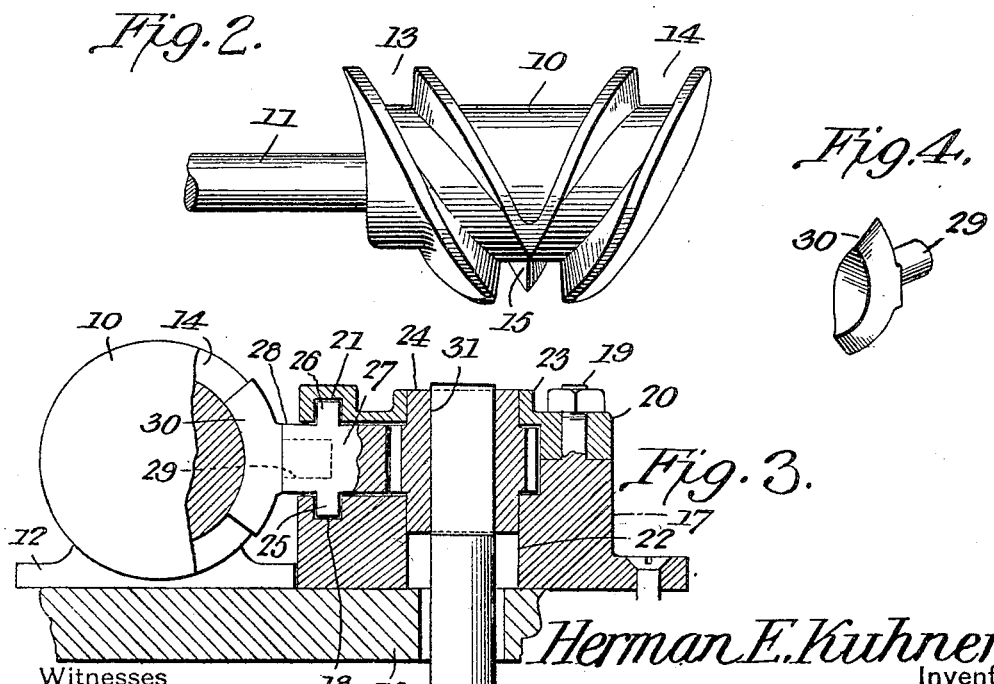
Herman E. Kuhner, Inventor,
Witnesses
by C. A. Snow & Co.
Attorneys

UNITED STATES PATENT OFFICE.

HERMAN E. KUHNER, OF DAVENPORT, IOWA.

MECHANICAL MOVEMENT.

No. 801,021.　　　　Specification of Letters Patent.　　　　Patented Oct. 3, 1905.

Application filed April 1, 1905. Serial No. 253,293.

*To all whom it may concern:*

Be it known that I, HERMAN E. KUHNER, a citizen of the United States, residing at Davenport, in the county of Scott and State of Iowa, have invented a new and useful Mechanical Movement, of which the following is a specification.

This invention relates to improvements in mechanical movements, and has for its object to produce an improved structure whereby a constant rotary motion in one direction is converted into alternating rotary motion.

With this and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation.

In the drawings, Figure 1 is a plan view of the improved device with the cam-drum in one position. Fig. 2 is a side view of the cam-drum in another position. Fig. 3 is a sectional view on the line 3 3 of Fig. 1. Fig. 4 is a perspective view of the cam-shoe detached.

The improved device may be employed for a variety of purposes where it is required to produce an alternating rotary motion from a constant rotary motion, but is designed more particularly for use upon certain forms of washing-machines to impart alternating rotary motion to the rubber member and for the purpose of illustration is shown in the drawings, embodied in a mechanism capable of use for operating a machine of this class.

The improved device comprises a drum 10, mounted for rotation, as by a shaft 11 and bearing 12, and provided with two encircling cam-grooves 13 14, disposed at reverse angles to the axis of the drum and intersecting at their nearest points or merging into each other, as at 15. The bearing 12 is connected to a suitable base 16, such as the hinged cover of a washing-machine, and likewise connected to this base member is a bracket 17, having a longitudinal channel 18, and connected to this bracket, as by bolts 19, is a cap member 20, having a corresponding longitudinal channel 21 parallel to the channel 18 and spaced therefrom. The base member 17 and cap member 20 are provided, respectively, with bearings 22 23, in which a pinion 24 is mounted for rotation and mounted for reciprocation in the channels 18 21, as by longitudinal ribs 25 26, is a gear-rack 27 and engaging the pinion 24. The rack 27 is provided with a projecting hub 28, having a socket for receiving a stud 29 extending from a cam-shoe 30, the latter curved to conform to the body of the drum 10 and bearing upon the same within the cam-grooves 13 14. The ends of the cam-shoe are pointed, as shown, so that it will not catch upon the sides of the cam-grooves. The cam-shoe is relatively elongated, so that it will "bridge" over the gap between the cam-grooves at their intersecting-point at 15, as hereinafter explained. The structure or member to be rotated alternately is connected to the pinion 24, as by a square socket 31—as, for instance, the rubber member of a washing-machine.

A fly-wheel may be connected to the shaft 11, if required, and any suitable means employed for operating the shaft; but as these parts of the device form no part of the present invention they are not illustrated.

With an apparatus thus constructed and assembled it is obvious that when the shaft 11 is rotated constantly in one direction the cam-grooves 13 14, acting upon the cam-shoe 30, will cause it to travel back and forth longitudinally of the drum 10 and carry the gear-rack with it, which, acting in turn upon the pinion 24, will alternately rotate the same from right to left and left to right, the distance moved at each stroke or the number of revolutions imparted at each movement being controlled by the sizes of the parts.

When employed for operating the rubber members of a washing-machine, the parts will be so proportioned that when a full revolution is imparted to the shaft 11 the pinion will be revolved two-thirds of a revolution in one direction and two-thirds of a revolution in the opposite direction; but it will be understood that these proportions may be varied to any required extent without departing from the principle of the invention, and I do not, therefore, desire to be limited to any specific proportions for the different parts of the device.

The pinion 24 is formed with shoulders where it engages the bearings 22 23 and is firmly supported rotatively in position thereby, while at the same time the parts are readily accessible for renewal or repairs.

The device is simple in construction, strong and durable, and will operate effectually for the purposes described.

Having thus described the invention, what is claimed is—

In a device of the class described, a base member having a longitudinal channel and a transverse bearing spaced from said channel, a cap member having a longitudinal channel spaced from the channel in said base member and in alinement therewith, and with a bearing in alinement with the bearing in said base member, means for connecting said cap member to said base member, a pinion having journals at the ends with shoulders between the journals and the body of the pinion for bearing upon the inner faces respectively of said base member and cap member, a gear-rack for engaging said pinion and provided with ribs bearing in said channels, a drum having encircling cam-grooves reversely inclined to the axis of the same and intersecting at one side and mounted for rotation, and a cam-shoe relatively connected to said gear-rack and operating in said cam-grooves.

In testimony that I claim the foregoing as my own I have hereto affixed my signature, in the presence of two witnesses.

HERMAN E. KUHNER.

Witnesses:
ISAAC PETERBERGER,
EFFIE WINGSMITH.